United States Patent Office

Re. 27,912
Reissued Feb. 5, 1974

27,912

SCUM-RETARDANT CARRIER PARTICLES AND COMPOSITIONS THEREOF

Howard A. Miller, Rochester, N.Y., assignor to Eastman Kodak Company, Rochester, N.Y.

No Drawing. Original No. 3,547,822, dated Dec. 15, 1970, Ser. No. 702,201, Feb. 1, 1968. Application for reissue Dec. 23, 1971, Ser. No. 211,629
Int. Cl. G03g *9/02*
U.S. Cl. 252—62.1 10 Claims

Matter enclosed in heavy brackets [ ] appears in the original patent but forms no part of this reissue specification; matter printed in italics indicates the additions made by reissue.

ABSTRACT OF THE DISCLOSURE

Magnetically responsive carrier particles for use in magnetic-brush development of electrostatic images, comprising a core of ferromagnetic material overcoated with a thin, continuous layer of a film-forming, alkali-soluble carboxylated polymer. The particles have a reduced tendency to cause scum formation on the surface of a photoconductive element.

This invention relates to electrophotograpy, and more particularly, to magnetically attractable carrier particles useful in the magnetic-brush type development of electrostatic latent images.

Electrophotographic imaging processes and techniques have been extensively described in both the patent and other literature, for example, U.S. Pat. Nos. 2,221,776; 2,277,013; 2,297,691; 2,357,809; 2,551,582; 2,825,814; 2,833,648; 3,220,324; 3,220,831; 3,220,833 and many others. Generally, these processes have in common the steps of employing a normally insulating protoconductive element which is prepared to respond to imagewise exposure with electromagnetic radiation by forming a latent electrostatic charge image. The electrostatic latent image is then rendered visible by a development step in which the charged surface of the photoconductive element is brought into contact with a suitable developer mix.

One method for applying the developer mix is by the well-known magnetic brush process. Such a process can utilize apparatus of the type described, for example, in U.S. Pat. No. 3,003,462 and often comprises a nonmagnetic rotatably mounted cylinder having fixed magnetic means mounted inside. The cylinder is arranged to rotate so that part of the surface is immersed in or otherwise contacted with a supply of developer mix. The granular mass comprising the developer mix is magnetically attracted to the surface of the cylinder. As the developer mix comes within the influence of the field generated by the magnetic means within the cylinder, the particles thereof arrange themselves in bristle-like formations resembling a brush. The bristle formations of developer mix tend to confrom to the lines of magnetic flux, standing erect in the vicinity of the poles and lying substantially flat when said mix is outside the environment of the magnetic poles. Within one revolution the continually rotating tube pick up developer mix from a supply source and returns part or all of this material to the supply. This mode of operation assures that fresh mix is always available to the copy sheet surface at its point of contact with the brush. In a typical rotational cycle, the roller performs the successive steps of developer-mix pickup, brush formation, brush contact with the photoconductive element, brush collapse and finally mix release.

In magnetic-brush development of electrostatic images, the developer is commonly a triboelectric mixture of fine toner powder comprised of dyed or pigmented thermoplastic resin with coarser carrier particles of a soft magnetic material such as "ground chemical iron" (iron filings), reduced iron oxide particles or the like. Such coarse carrier particles when used for repeated magnetic brush development of the same photoconductive element, often tend to scratch or otherwise abrade the photoconductive surface. Such scratching ultimately results in a poor quality image being produced.

Another undesirable quality of prior iron or iron-alloy carrier particles when used in developing compositions is the tendency of the developer to deposit scum on the surface of a reusable photoconductive element. The continued contact of such developing compositions often results in the deposition of a difficultly removable layer of surface scum on the photoconductor. This layer of scum may comprise "fines" of the toner powder and/or contaminant present on the surface of the carrier particles. Regardless of the composition of such scum, it acts as an area of irregular optical density which reduces the effective sensitivity of the photoconductive layer. In addition, the effect of this scumming is magnified when there is abrasion of the photoconductor as mentioned above.

Accordingly, there is a need for iron carrier particles which reduce the tendency of magnetic-brush developer compositions to deposit scum on the surface of reusable electrophotographic elements.

It is therefore an object of this invention to provide novel ferromagnetic carrier particles having a reduced tendency to cause scumming of photoconductive layers.

It is another object of this invention to provide novel carrier particles for use in magnetic-brush development which particles have a reduced tendency to abrade the surface of the photoconductive element.

A further object of this invention is to provide new magnetically responsive carrier particles having high electrical surface resistance.

Still another object of this invention is to provide new developing compositions for use in magnetic-brush development.

These and other objects and advantages are accomplished in accordance with this invention by coating conventional ferromagnetic carrier particles with thin layers of film-forming, alkali-soluble carboxylated polymers.

The carrier materials which can suitably be coated in accordance with this invention include ferromagnetic materials such as iron in such forms as reduced iron oxide bits, iron filings and the like; nickel; cobalt; as well as alloys containing nickel, iron and cobalt etc. Such ferromagnetic materials are used as a core in accordance with this invention over which is coated a carboxylated polymer. The core can consist of a solid particle of ferromagnetic material or can be a nonferromagnetic particle overcoated with ferromagnetic materials as described in copending Miller U.S. patent application Ser. No. 699,030, filed Jan. 19, 1968, entitled "Metal-Shell Carrier Particles." The ferromagnetic core can vary in size and shape with useful results being obtained with core sizes of from about 0.045 to about 0.0015 inch average diameter. Particularly useful results are obtained with core sizes of from about 0.023 to about 0.005 inch average diameter. The size of the core particles used will, of course, depend upon several factors such as the type of images ultimately developed, desired thickness of the carboxylated polymer coating etc.

The carboxyl content of the polymers useful in the practice of this invention is generally not sufficiently high to make the polymer water-soluble in the free acid form. The carboxyl content is, however, sufficient to produce solubility when the pH is raised to a value of above about 4 to 6 by addition of alkali. Carboxyl contents of about 2 to about 15 milliequivalents per gram based on the dry weight of 1 g. of the film-forming polymer work satisfactorily. Particularly useful coatings can be made with polymers having carboxyl contents varying between about 4 and about 12 milliequivalents. The carboxyl content can be determined using standard procedures such as titration with a 1 N solution of sodium hydroxide using a 1 g. portion of the polymer.

Typical carboxylated polymers useful in this invention include the following, among others: carboxy ester-lactone resin as described in U.S. Pat. No. 3,007,901; methyl methacrylate-methacrylic acid 1:1 copolymer; butyl methacrylate-methacrylic acid 1:1 copolymer; styrene-maleic acid (approx. 1:1) copolymer; methylvinyl ether-maleic acid 1:1 copolymer; carboxyester lactone resin prepared as described in U.S. Pat. No. 3,260,706; etc.

The concentration of carboxylated polymer required to inhibit substantially all scum formation is as little as about 0.1% of the weight of the carrier particles coated, High concentrations of up to about 5% or even higher can be used; however, little further improvement in the scum-inhibiting effectiveness is realized with higher concentrations. Nevertheless, the higher concentrations are often desirable for purposes other than simply to reduce scum formation. For example, as the concentration of resin is increased, the resiliency of the carrier particle is enhanced and thus its tendency to abrade the photoconductive surface is reduced. In general, the preferred range of polymer concentration is from about 0.5 to about 2.5% by weight based on the weight of the core material coated.

In accordance with this invention, an aqueous solution of the polymer at a pH of from about 4 to about 9, can be used. Coating can then be carried out by forming a polymer solution which is sufficiently dilute to readily and uniformly wet all of the uncoated metal carrier particles. The polymer solution can be added dropwise, as a thin stream or it can be sprayed over the metal carrier powder as the powder is turned over or otherwise agitated. In this manner a uniform coating can be achieved on each particle. Of course, other methods of application which result in the formation of a thin, continuous, relatively uniform layer of the aqueous polymer on the carrier particle can also be used. After coating, all solvent is then removed by drying, for example, with forced warm air, while continually mixing or stirring the particles so as to expose all surfaces of the carrier to the drying air.

The scum-preventive coating which is laid down in accordance with this invention is of a complex nature. During the drying operation the resin-coated carrier becomes warm as a result of an exothermic reaction. In addition, the color changes gradually from the gray color of iron carrier particles to a much warmer tone, frequently a coffee-brown color. The change in color and the heat liberated indicate a surface oxidation of the particles takes place during the drying operation. The resulting iron carrier particles thus have a mixed coating if iron oxide and carboxylated resin and/or the iron salt of the resin. Particles having this mixed coating exhibit a substantial increase in surface resistance compared to uncoated iron and even when compared with iron coated with comparable quantities of more highly insulating resins than the present carboxylated polymers. For example, iron particles coated with 0.5% by weight of a carboxyester lactone resin in accordance with this invention show a resistance of 450,000 ohms; whereas iron particles coated with 2.5% by weight of a polyvinyl butyral resin show a resistance of 75,000 ohms.

For purposes of comparison, the resistance of the carrier particles is measured in a standard resistance test. The standard test is conducted each time using a 15 g. quantity of carrier particles. The particles are placed on a stationary magnet where they are held in the form of a brush. The resistance of the brush is then measured between electrodes having a surface area of about 1 square inch. The resistance of the particles in the magnetic brush is measured with these electrodes positioned about 3/16 inch apart.

The substantial increase in surface resistance of the present coated particles is believed to be attributable mainly to the presence of the iron oxide and/or any iron salts formed with the polymer overcoat. The carboxylated polymers by themselves contribute very little to this large increase in resistance.

In addition, it has been found that the scum-preventive properties of the carboxylated polymer coated carrier particles of the invention are greater than those having an oxide surface prepared by other means, such as by heat or other treatment. Furthermore, the present coated particles have a reduced tendency to scum in comparison with particles coated with comparable weights of such materials as cellulose acetate butyrate, polyvinyl butyral, polyvinyl acetate, polyethylene and also when compared with carriers bearing a combination of such a non-carboxylated resin coating over an underlayer of oxide prepared, for example, by heating the iron powder in air.

The exact reason for the greatly improved resistance to scumming which the present particles exhibit is not entirely known. One hypothesis is that the presence of the carboxyl group in the polymer overcoat results in a hydrophilic surface being presented to the normally hydrophobic toner granules. Thus, the only force tending to attract the granules to the carrier is the triboelectric force between the two materials. Consequently, when the toner granules, carried on the coated particles, are presented to an electrostatic image, the granules are readily attracted to the image leaving a "clean" magnetic brush. However, with non-hydrophilic carrier coatings, there is another attraction between the carrier and the toner in addition to the normal triboelectric attraction. The additional attraction results in the magnetic brush "smearing" the hydrophobic toner against the photoconductor. This attraction is believed in part to be caused by localized frictional heating which results in softening of the toner granules. The softened toner then appears to act much the same as greasy lithographic ink does when it is attracted to the ink receptive portion of a lithographic; the toner is similarly attracted to the surface of the prior non-hydrophilic carrier particles. Thus, there is a greater tendency for toner to adhere to non-hydrophilic carrier particles when used in magnetic-brush development. Because of this increased attraction, toner granules become somewhat rigidly attached to the carrier particles and cannot undergo rotational movement. The rigidly held toner is thus continually rubbed against the photoconductor. This continual rubbing eventually results in the deposition of a scum on the photoconductive surface. However, as mentioned above, the carboxylated polymer coating of the present invention repels the softened toner so that it does not adhere but remains free to roll against the carrier and/or the photoconductor surface.

Electroscopic developer compositions can be prepared by mixing the present scum-retardant carriers with a suitable electroscopic toner material. The toner used with the carrier particles of this invention can be selected from a wide variety of materials to give desired physical properties to the developed image and the proper triboelectric relationship to match the carrier particles used. Generally any of the toner powders known in the art are suitable for mixing with the carrier particles of this invention to form a developer composition. When the powder toner selected is utilized with ferromagnetic carrier particles in a magnetic-brush development arrangement, the toner clings to the carrier by triboelectric attraction. The carrier particles acquire a charge of one polarity and the toner acquires a charge of the opposite polarity. Thus, if the carrier is mixed with a resin toner which is higher in the triboelectric series, the toner normally acquires a positive charge and the carrier a negative charge.

Toner powders suitable for use in this invention are typically prepared by micronizing a resinous material and mixing with a coloring material such as a pigment or a dye. The mixture is then ball milled for several hours and heated so that the resin flows and encases the coloring material. The mass is cooled, broken into small chunks and micronized again. After this procedure the toner powder particles usually range in size from about 0.5 to about 25$\mu$, with an average size of about 2 to about 15$\mu$.

The resin material used in preparing the toner can be selected from a wide variety of materials, including natural resins, modified natural resins and synthetic resins. Exemplary of useful natural resins are balsam resins, colophony and shellac. Exemplary of suitable modified natural resins are colophony-modified phenol resins and other resins listed below with a large proportion of colophony. Suitable synthetic resins are all synthetic resins known to be useful for toner purposes, for example polymers, such as vinyl polymers including polyvinyl chloride, polyvinylidene chloride, polyvinyl acetate, polyvinyl acetals, polyvinyl ether and polyacrylic and polymethacrylic esters; polystyrene and substituted polystyrenes or polycondensates, e.g. polyesters, such as phthalate resin, terephthalic and isophthalic polyesters, maleinate resin and colophony-mixed esters of higher alcohols; phenol-formaldehyde resins, including colophony-modified phenol-formaldehyde condensates, aldehyde resins, ketone resins, polyamides and polyadducts, e.g. polyurethanes. Moreover polyolefins, such as various polyethylenes, polypropylenes, polyisobutylenes and chlorinated rubber are suitable. Additional toner materials which are useful are disclosed in the following U.S. patents: 2,917,460; Re. 25,136; 2,788,288; 2,638,416; 2,618,552 and 2,659,670.

The coloring material additives useful in suitable toners are preferably dyestuffs and colored pigments. These materials serve to color the toner and thus render it more visible. In addition, they sometimes affect, in known manner, the polarity of the toner. In principle, virtually all of the compounds mentioned in the Color Index, vols. I and II, 2nd ed., 1956, can be used as colorants. Included among the vast numbers of suitable colorants would be such materials as Nigrosin Spirit soluble (C.I. 50415), Hansa Yellow G (C.I. 11680), Chromogen Black ET00 (C.I. 14645), Rhodamine B (C.I. 45170), Solvent Black 3 (C.I. 26150), Fuchsine N (C.I. 42510), C.I. Basic Blue 9 (C.I. 52015) etc.

Unless otherwise indicated, the carboxyl content of the polymers of this invention is determined by direct titration in 1:1 acetone-water (200 ml./g. of dry polymer) with N/2 NaOH to a phenolphthalein endpoint. From this determination, the total free carboxyl groups present can be expressed as the number of milliliters of N NaOH solution/gram of dry resin or the carboxyl content can be expressed in milliequivalents of N NaOH/gram of dry polymer.

The following examples are included for a further understanding of the invention.

EXAMPLE 1

A 2,000 g. quantity of carrier material which comprises bits of reduced iron having a particle size such that it will pass a 60-mesh screen but will be retained by a 120-mesh screen (Glidden 388 Plast-Iron carrier), is divided into five portions of 400 g. each. One portion is set aside without further treatment to serve as a control. A second portion is provided with a thin, surface layer of iron oxide by heating while stirring in a porcelain crucible for 10 minutes at 300° C. The initial gray color of the iron changed to purplish black and the resistance as measured in the standard test referred to above changed from 2,300 ohms before heating to 84,000 ohms after heating. The other three 400 g. quantities are then coated, respectively, with ⅛, ½ and 2 percent by weight of a film-forming carboxyester-lactone resin prepared in accordance with Example 6 of U.S. Pat. No. 3,007,901 and having a carboxyl content of about 5 milliequivalents of N NaOH/gram of dry polymer. To accomplish this, a 10 percent solution of the lactone is prepared by dissolving the resin in water with the aid of sodium hydroxide to produce a solution having a pH of 4.5. Next, three separate portions of the solution, measuring 6.25, 25 and 100 ml., are each diluted with 125 cc. of water and each diluted portion is sprayed onto one of the remaining 400 g. quantities of carrier. Each batch is then continually mixed while drying in a current of air at room temperature. As the powder dries it begins to warm up to temperatures of about 50° C. At the same time the coated iron gradually changes to a coffee-brown color. After the powders have dried completely and cooled to room temperature, the five samples are tested for abrasiveness and scumming tendency. The apparatus for testing comprises a cylindrical aluminum tube arranged to rotate axially in a horizontal position about a fixed permanent magnet. The permanent magnet has its poles oriented such that when ferromagnetic particles are present, a magnetic brush is formed on the top of the cylinder. In the test procedure this mechanical magnetic brush is run for 30 minutes in contact with a photoconductive layer comprising an organic photoconductor in a resin binder. The unmodified carrier (control) and the carrier having the heat-treated oxide surface leave appreciable scum and abrasion markings on the photoconductor surface. However, no scum is observed with any of the resin-coated carriers and the abrasion observed is less in all cases. In addition, it appears that abrasion decreases with increasing concentration of the resin coat. The five batches of carrier are then used to make separate triboelectric mixtures with 3 percent by weight of black toner having an average particle size of about 8$\mu$ and comprising carbon-black colorant in a styrene polymer binder. The toner charges positively on the iron carrier. The resulting developers are tested in the same manner as the carriers alone are tested. The control developer causes abrasions and scum although not as severe as in the test without any toner. Similar results regarding abrasion and scum are observed with the developer containing the oxidized carrier. None of the three developers representing the resin-coated carriers of the invention produce any scum. As in the tests with the carrier alone, the abrasion is less than that noted with the uncoated carrier and the oxidized carrier. The abrasion of the resin-coated carrier varies inversely with the concentration of resin. The five developers are next used to develop negative electrostatic images on organic-photodonductor xerographic layers of the type used in the scumming and abrasion tests. Images are obtained in all cases. However, the three revelopers made with the resin-coated carriers develop the image more readily and produce copies having better image discrimination with less undesirable background.

EXAMPLE 2

Repeating the procedure of Example 1, six 500 g. quantities of the same iron carrier are each coated with a 0.25 percent concentration of one of the six carboxylated polymers of Table I. The coatings are made using 12.5 ml. of a 10 percent aqueous solution of each of the polymers, diluted to 100 ml. with distilled water. Three additional 500 g. quantities of iron were each coated with ¼ percent of resin from a 1 percent solution in dichloromethane of one of the following noncarboxylated polymers: cellulose acetate butyrate, polyvinyl butyral and polyvinyl acetate. A fourth quantity of 500 g. of iron is coated with ¼ percent polyethylene from a 2 percent solution in hot cyclohexane. Each of the ten quantities are individually dried with forced air at room temperature while stirring. The six quantities of carrier coated with a carboxylated polymer warm appreciably during the drying operation and turn brown. The other four quantities drop below room temperature during the drying, as a result of evaporative cooling. In addition, no color change is observed in the particles coated with the noncarboxylated polymers. The scum and abrasion tests of Example 1 are repeated with all ten coated materials and with a control of a 500 g. quantity of uncoated iron. A reduction of abrasion of the photoconductive surface of about the same order of magnitude is noted with all ten samples when compared with the uncoated control iron. All ten resin-coated samples produce a reduction in the degree of scumming, both in the tests with the carrier alone and in tests using a developer comprising 4 percent by weight of a toner consisting of a nigrosine colorant in a styrene butylmethacrylate copolymer binder. However, the four carriers coated with noncarboxylated polymers reduced this scumming only partially; whereas, scum is essentially completely inhibited by the use of the six carboxylated-resin-coated carriers.

TABLE I

| | Carboxylated polymer | Carboxyl content in milliequivalents of N NaOH/g. | pH[1] |
|---|---|---|---|
| I | Carboxy-ester-lactone resin prepared as described in Minsk U.S. Patent 3,007,901 | [2] 5.0 | 4.5 |
| II | Methyl methacrylate-methacrylic acid 1:1 copolymer | 5.8 | 6.5 |
| III | Butylmethacrylate-methacrylic acid 1:1 copolymer | 4.7 | 7.5 |
| IV | Styrene-maleic acid (approx. 1:1) copolymer (inherent viscosity of the styrene-maleic-anhydride copolymer precursor, 0.22) | [2] 9.0 | 7.9 |
| V | Methylvinyl ether-maleic acid 1:1 copolymer (Gantrez AN-119 from General Analine and Film Company) | 11.5 | 7.2 |
| VI | Carboxy ester-lactone resin prepared as described in Minsk-Abel U.S. Patent 3,260,706 | [2] 5.0 | 6.6 |

[1] Adjusted in 10 percent aqueous solution with NaOH.
[2] Approximately.

Carboxylated polymer No. I is a mixed alkyl ester and carboxy ester lactone prepared by reaction of glycolic acid and n-hexyl alcohol with an interpolymer of vinyl acetate and maleic anhydride in accordance with Example 6 of U.S. Pat. No. 3,007,901. This polymer is made by mixing 1390 ml. of dioxane, 940 ml. of 70% glycolic acid, 450 ml. n-hexanol and 300 g. of vinyl acetate-maleic anhydride heteropolymer (inherent viscosity=0.21). The suspension is stirred until smooth and 108 ml. concentrated sulfuric acid is added. The resultant dope is stirred and heated for several hours, cooled and diluted with acetone. The diluted dope is then poured into distilled water, stirred and washed again in distilled water until free of mineral acid. Finally the polymer is dried at room temperature. Polymer No. VI above is prepared in accordance with Example 1 of U.S. Pat. No. 3,260,706 by stirring for 1 to 2 hours a mixture of 200 grams of vinyl acetate-maleic anhydride interpolymer (inherent viscosity=0.29), 600 ml. of distilled water and 75 ml. of n-butylalcohol. Next 68 ml. of concentrated sulfuric acid are added and the mass is heated for about 20 hours. The solid formed is separated from the liquid and kneaded in a mill with repeated changes of water. The polymer is then oven dried overnight at 40° C.

This invention has been described in considerable detail with reference to certain preferred embodiments thereof, but it will be understood that variations and modifications can be effected within the spirit and scope of the invention as described hereinabove and as defined in the appended claims.

I claim:

[1. In a developer composition for use in the development of electrostatic charge patterns and comprising a physical mixture of magnetically attractable carrier particles and smaller electroscopic toner particles, the improvement wherein said carrier particles are comprised of a core of ferromagnetic material overcoated with a thin, continuous layer of a film-forming, alkali-soluble carboxylated polymer having a carboxyl content of from about 2 to about 15 milliequivalents of 1 N NaOH per gram of polymer based on the dry weight of said polymer.]

[2. A developer composition as described in claim 1 wherein said carboxylated polymer is present in an amount of from about 0.1 to about 5.0 percent by weight based on the weight of the core.]

[3. A developer composition as described in claim 1 wherein the ferromagnetic core contains a material selected from the group consisting of iron, nickel, cobalt and alloys thereof.]

[4. A developer composition as described in claim 1 wherein the polymer is methyl methacrylate-methacrylic acid copolymer.]

[5. A developer composition as described in claim 1 wherein the polymer is butyl methacrylate-methacrylic acid copolymer.]

[6. A developer composition as described in claim 1 wherein the polymer is methylvinyl ether-maleic acid copolymer.]

[7. A developer composition as described in claim 1 wherein the average size of the core particle is from about 0.045 to about 0.0015 inch.]

[8. A developer composition as described in claim 1 wherein said carboxylated polymer is a mixed alkyl ester and carboxy ester lactone prepared by reaction of glycolic acid and n-hexyl alcohol with an interpolymer of vinyl acetate and maleic anhydride.]

9. An electroscopic developer composition comprising a mixture of toner granules and carrier particles wherein each carrier particle comprises a core of ferromagnetic material overcoated with a thin continuous layer of a film-forming, alkali-soluble carboxylated polymer applied *from an aqueous mixture having a pH of from about 4 to about 9, said polymer* having a carboxyl content of from about 4 to about 12 milliequivalents of 1 N NaOH per gram of polymer based on the dry weight of said polymer.

10. An electroscopic developer composition as in claim 9 wherein the ferromagnetic material is selected from the group consisting of iron and iron alloy and wherein the polymer is present on each particle in an amount of from about 0.5 to about 2.5 percent by weight based on the weight of the core.

*11. In a developer composition for use in the development of electrostatic charge patterns and comprising a physical mixture of magnetically attractable carrier particles and smaller electroscopic toner particles, the improvement wherein said carrier particles are comprised of a core of ferromagnetic material overcoated with a thin, continuous layer of a film-forming, alkali-soluble carboxylated polymer applied from an aqueous mixture having a pH of from about 4 to about 9, said polymer having a carboxyl content of from about 4 to about 12 milliequivalents of 1 N NaOH per gram of polymer based on the dry weight of said polymer.*

*12. A developer composition as described in claim 11 wherein said carboxylated polymer is present in an amount of from about 0.1 to about 5.0 percent by weight based on the weight of the core.*

*13. A developer composition as described in claim 11 wherein the ferromagnetic core contains a material selected from the group consisting of iron, nickel, cobalt and alloys thereof.*

*14. A developer composition as described in claim 11 wherein the polymer is methyl methacrylate-methacrylic acid copolymers.*

*15. A developer composition as described in claim 11 wherein the polymer is butyl methacrylate-methacrylic acid copolymer.*

*16. A developer composition as described in claim 11 wherein the polymer is methylvinyl ether-maleic acid copolymer.*

*17. A developer composition as described in claim 11 wherein the average size of the core particle is from about 0.045 to about 0.0015 inch.*

*18. A developer composition as described in claim 11 wherein said carboxylated polymer is a mixed alkyl ester*

*and carboxy ester lactone prepared by reaction of glycolic acid and n-hexyl alcohol with an interpolymer of vinyl acetate and maleic anhydride.*

References Cited

The following references, cited by the Examiner, are of record in the patented file of this patent or the original patent.

UNITED STATES PATENTS

| | | | |
|---|---|---|---|
| 3,007,901 | 11/1961 | Minsk | 96—83 X |
| 3,260,706 | 7/1966 | Minsk | 260—78.5 |
| 3,121,642 | 2/1964 | Bishup | 117—100 |
| 3,054,751 | 9/1962 | Blake et al. | 117—100 |

| | | | |
|---|---|---|---|
| 2,890,968 | 6/1959 | Giamo | 252—62.1 |
| 2,874,063 | 2/1959 | Greig | 117—17.5 |

FOREIGN PATENTS

| | | | |
|---|---|---|---|
| 1,174,571 | 12/1969 | Great Britain | 252—62.1 |
| 689,326 | 11/1966 | Belgium | 252—62.1 |

NORMAN G. TORCHIN, Primary Examiner

J. P. BRAMMER, Assistant Evaminer

U.S. C.I. X.R.

117—100